INVENTORS
REINHARD GLANG
LEON I. MAISSEL

BY George O. Saile

ATTORNEY

United States Patent Office 3,472,074
Patented Oct. 14, 1969

3,472,074
MAXIMUM THERMOMETER FOR SURFACE TEMPERATURE MEASUREMENTS
Reinhard Glang and Leon I. Maissel, Poughkeepsie, N.Y., assignors to International Business Machines Corporation, Armonk, N.Y., a corporation of New York
Filed Dec. 29, 1966, Ser. No. 605,638
Int. Cl. G01k 5/18
U.S. Cl. 73—362                                11 Claims

ABSTRACT OF THE DISCLOSURE

A thin film maximum surface temperature sensor device that can be mounted directly on the surface of an article which is to have its maximum surface temperature measured. The device includes a thermally conductive substrate which can be attached to the surface of the article. The thin film must be composed of a material having a resistance characteristic such that its resistance permanently changes to correspond to the maximum temperature to which it has been subjected. One such material is an intimate mixture of chromium and silicon monoxide. Electrical connectors are provided for making contact to the thin film, such as electrically conductive layers of metal supported on the substrate in electrical contact with the thin film. The thin film thus has a memory of the temperature to which it has been subjected, in the form of its resistance, which can be interrogated at any appropriate time.

---

Figure 4:
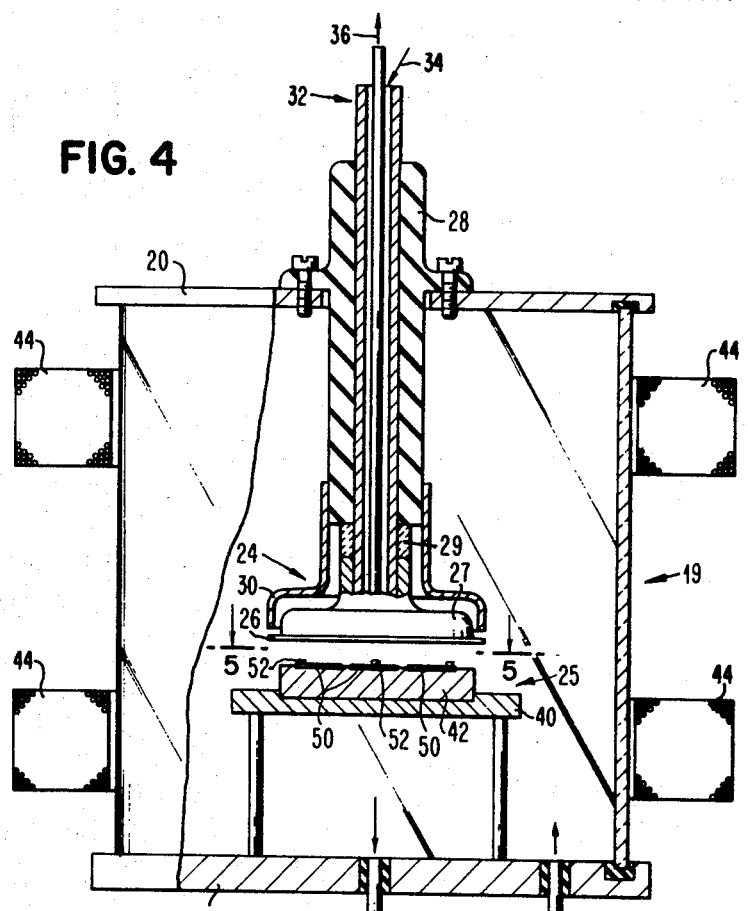

This invention relates to a maximum surface temperature sensing device and to a method of using the device, and more particularly to a temperature sensing device and method of using the device which allow the sensing or measurement of the maximum surface temperature of an article in situations where conventional temperature sensing means fail.

There are various standard means for measuring temperature such as thermocouples, resistance thermometers and temperature sensitive paints. These devices are widely used and very effective under circumstances. However, there are situations where knowledge of the maximum surface temperature to which an article has been subjected is required and because of the article's small size or the environment in which the article is at the time of its subjection to the elevated temperature the standard devices are rendered ineffective. This result could be due to relatively high thermal capacitance and conductance, or interaction with the atmosphere surrounding the article. In addition, there are circumstances where conventional instruments measure the average temperature over a relatively large area and could not resolve very small regions, for example less than one or two square millimetres in area. An example of the problem is in the sputtering environment where an RF field and glow discharge near the surface of the article cause spurious readings in conventional temperature measurement devices.

It is therefore an object of this invention to provide a thermometer for determining the maximum surface temperature to which an article has been subjected.

It is another object of this invention to provide a thin film maximum surface temperature measuring device which can be mounted directly on the surface of the article to have its maximum surface temperature measured and which is accurate in this measurement regardless of the size of the article upon which it is mounted.

It is a further object of this invention to provide a new method for determining the maximum surface temperature to which an article has been subjected.

These and other objects are accomplished in accordance with the broad aspects of the present invention by providing a maximum surface temperature measurement device which is very small in size. The device includes a thermally conductive substrate which can be attached to the surface of the article whose maximum surface temperature it is desired to measure. A thin film, such as an intimate mixture of chromium and silicon monoxide, is supported on the substrate. Means are provided for making electrical contact to the thin film, such as electrically conductive layers of metal supported on the substrate in electrical contact with the thin film. The necessary characteristic of this thin film is its ability to adjust its resistance to the maximum temperature it has been subjected to and to not significantly change this resistance under any circumstance other than its being subjected to a still higher temperature. The thin film thus has a memory of the temperature to which it has been subjected, in the form of its resistance, which can be interrogated at any appropriate time. When the device is subjected along with the article to an elevated temperature above the maximum temperature to which the thin film had been previously subjected, the resistance of the thin film is altered to a degree which corresponds to the temperature to which it was subjected. This thin film retains this resistance independent of extended heating at the maximum temperature or at a lower temperature.

The maximum surface temperature for an article is determined by positioning the thin film adjacent to the article to be subjected to an elevated temperature. The thin film and the article are then subjected to the elevated temperature. One limitation of the process is that the elevated temperature must be above the previous maximum temperature to which the thin film had been subjected during its lifetime. Following the subjection to an elevated temperature, the resistance of the thin film is measured at successively higher known temperatures to determine the maximum surface temperature of the article by observing at what temperature the resistance begins to rapidly decrease.

The foregoing and other objects, features and advantages of the present invention will be apparent from the following more particular description of the preferred embodiments of the invention as illustrated in the accompanying drawings.

Figure 1:
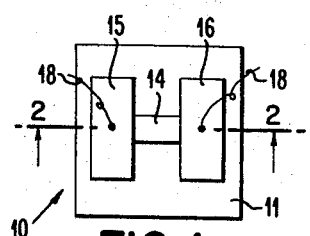
Figure 2:
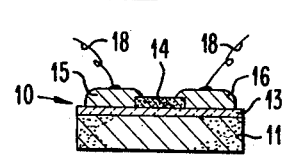
Figure 3:
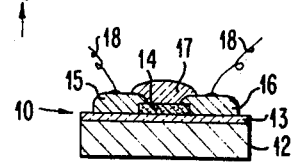
Figure 5:
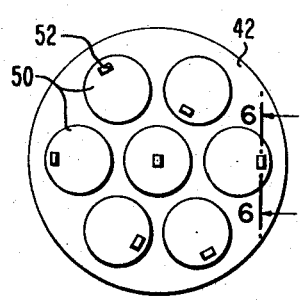
Figure 6:
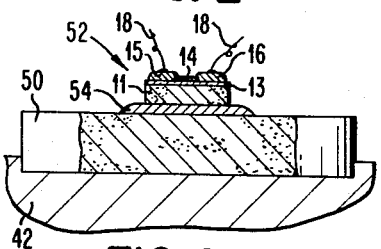
Figure 7:
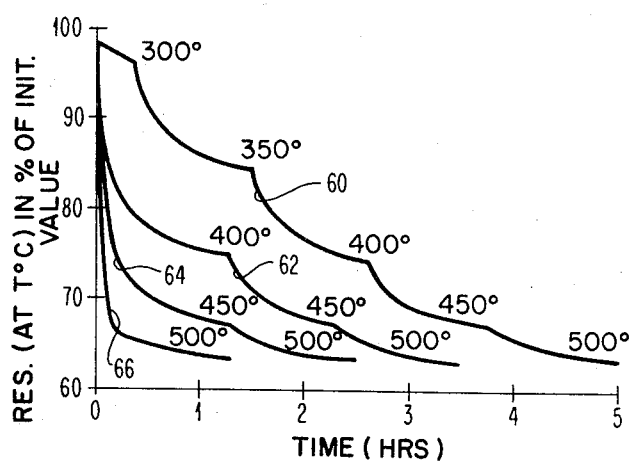
Figure 9:
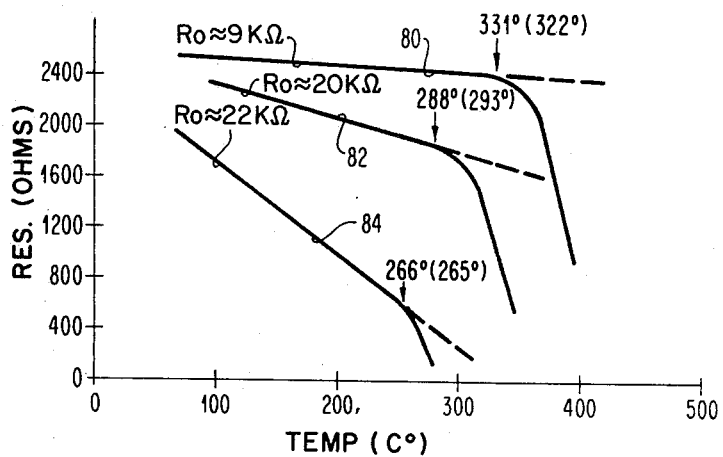
Figure 8:
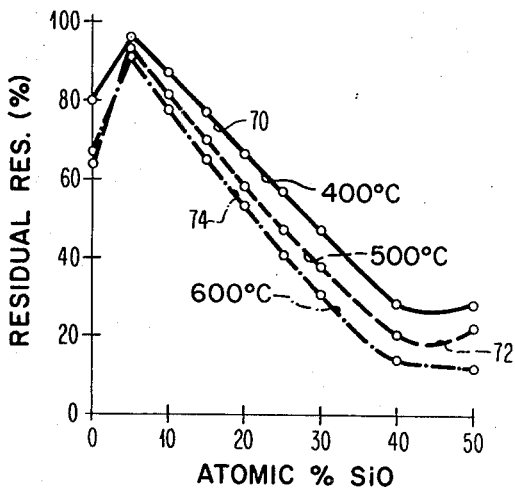

In the drawings:
FIGURE 1 is a greatly enlarged top view of one form of the maximum surface temperature measurement device of the present invention;
FIGURE 2 is a cross-sectional view taken along line 2—2 of FIGURE 1;
FIGURE 3 is a cross-sectional view of another form of the maximum surface temperature measurement device of the present invention;
FIGURE 4 is a schematic drawing of a typical sputtering system wherein the maximum surface temperature measurement device can be effectively used;
FIGURE 5 is a top view of the surface being coated in the sputtering chamber taken along lines 5—5 of FIGURE 4;
FIGURE 6 is a cross-sectional view of a temperature measuring device positioned on the article which is having its maximum temperature recorded taken along line 6—6 of FIGURE 5;
FIGURE 7 is a graphical representation showing the percentage changes in resistance undergone by measurement devices of the preesnt invention after subjection to a series of time and temperature treatments;
FIGURE 8 is a graphical representation showing percentage change in resistance of the thin film measurement devices as a function of their atomic percent silicon monoxide for several heat treatments; and
FIGURE 9 is a graphical representation showing the characteristic resistance rapid decrease beginning at the previous maximum temperature.

Referring now more particularly to FIGURES 1, 2 and 3 there is shown a typical maximum surface temperature device 10. The device includes a thermally conductive substrate 11 which may be either a semiconductor 11 as shown in FIGURE 2 or a metal 12 as shown in FIGURE 3 having a surface covering 13 of an insulator layer. The insulator layer 13 can be a thermally grown silicon dioxide layer where the substrate is silicon. Alternately, and particularly where the substrate is other than silicon, the layer 13 can be a glass, silicon nitride, silicon dioxide, silicon monoxide or other material deposited by any conventional process such as vacuum deposition, sputtering or pyrolytic deposition. A thin film 14 is located on the substrate. The thin film is composed of a material having a resistance characteristic that its resistance permanently changes to correspond to the maximum temperature to which it has been subjected. The preferred material used as the thin film is a cermet resistance material which is an intimate mixture of chromium and silicon monoxide. Electrically conductive layers of metal 15 and 16 are also preferably supported by the substrate and in electrical contact with the thin film 14. In some cases a protective coating 17 as shown in FIGURE 3 is used to completely cover thin film 14 so as to protect it from reactive gases in the atmosphere where the device is being used. Wire contacts 18 may be ultrasonically bonded to the layers of metal 15 and 16 so as to allow for convenient interrogation of the maximum surface temperature device at any suitable time.

FIGURE 4 shows one form of a sputtering apparatus wherein the maximum surface temperature measurement device is very effectively used. This sputtering apparatus includes a chamber 19 having a top plate 20 which is removably mounted on a base plate 21. A suitable gas, such as argon, supplied by a source 22 is maintained at a desired pressure in the chamber by means of a vacuum pump 23. Within the gas-filled enclosure are positioned an electrode structure 24 and a substrate support structure 25. The electrode assembly 24 includes the target 26 which is composed of the material to be sputtered. Mounted on or positioned adjacent to the target 26 is a metal electrode 27 which is designated a cathode for reference. This electrode 27 is insulated from the supporting column 28 by means of ceramic seal 29. The supporting column 28 is attached to the top plate 20 of the sputtering structure 19. A grounded shield 30 is supported on the post 28. The metal shield 30 partially encloses the electrode 27 and protects the electrode from unwanted sputtering. A cooling structure 32 having inlet and outlet ports 34 and 36, respectively, is centrally located within the post 28. The cooling structure 32 can be used to cool the electrode structure 24, if necessary, by circulating water or other fluid through the cooling structure 32. The copper cooling structure 32 is connected as the electrical conductor through the post 28 to connect the electrode with the RF power source (not shown).

The substrate support structure 25 includes a support means 40 which is mounted on the base plate 21 of the sputtering apparatus 19. A substrate holder 42 is positioned and held on the upper surface of the support means 40 by any convenient means. Semiconductor wafers 50, which are in this example to be coated, are positioned on the substrate holder by any conventional means. The maximum surface temperature measurement devices 52 are positioned on the several semiconductor wafers 50. Either cooling coils or heating means can be positioned within or adjacent to the substrate holder 42 for cooling or heating the wafer. The support structure 25 is connected as the other electrode of the sputtering apparatus. This electrode is designated for reference as the anode. The electromagnets 44 may be used to concentrate the glow discharge by the magnets' magnetic field.

FIGURE 5 shows a plan view of the substrate holder 42 having the semiconductor wafers 50 positioned thereon. The temperature measurement device 52 is mounted over the surface of the article of the article 50 to have its maximum surface temperature measured. The device 52 may be lightly clamped or simply laid on the substrate 50. However, the accuracy of the temperature measurement is dependent upon having the device 52 in intimate thermal contact with the article 50 so that the maximum temperature of the thin film will be identical with the maximum temperature of the article 50. This may be accomplished as illustrated in FIGURE 6 by providing a thermally conductive thin metallic film 54 between the article's surface and the measurement device 52. The preferred metal films 54 are gallium or a gallium-indium alloy because they can be applied easily by spreading the liquid metals over the surfaces at temperatures of 25–35° C.

The requirement for substantially identical temperatures for the thin film 14 and the article 50 requires that the thermally conductive substrate upon which the thin film 14 is supported be highly thermoconductive. FIGURE 2 shows a semiconductor substrate 11 which may be for example silicon or germanium—both of which are good heat conductors—and a dielectric film 13 thereover. The FIGURE 3 shows a metallic substrate 12 having a thin dielectric coating 13 to electrically insulate the metal substrate 12 from the conductive layers of metal 15 and 16. The preferred metal for the conductive substrate 12 is molybdenum and the preferred dielectric layers are silicon monoxide or silicon dioxide because they do not differ too widely in regard to their thermal expansion coefficients. A wide range of metals and dielectric materials, however, can be used for this purpose, provided there is enough adhension between the materials to avoid cracking, chipping, and blistering of the dielectric material.

The preferred thin film material is an intimate mixture of chromium and silicon monoxide. The composition can be between about 5 percent and 60 atomic percent silicon monoxide and the remaining chromium. However, the preferred composition is between about 15 to 50 atomic percent silicon monoxide and the remaining chromium. This range is preferred because the resistance changes are larger and therefore more easily recognized. The chromium and silicon monoxide thin film is preferred because resistance changes are larger than in pure metal films and therefore better detectable. This is because the resistance changes involve structural changes in the cermet film from amorphous to partially crystalline as discussed in the paper of R. Glang, R. A. Holmwood, and S. Clarke "Resistivity and Structure of Cr-SiO Cermet Films," Extended Abstracts of the 13th Nat. Vac. Symp., p. 91, San Francisco, Oct. 26–28, 1966. Further, this composition is preferred because experience has shown that the maximum temperature reached can be effectively determined by the resistance of the thin film regardless of the time, whether a few minutes or many hours, which the thin film was subjected to this temperature.

The method for determining the maximum surface temperature to which the article 50 has been subjected in, for example a sputtering chamber of FIGURE 4, is to position the thin film 14 adjacent to the article 50 to be subjected to the elevated temperature as shown in FIGURES 4, 5 and 6. The article 50 and the thin film 14 are subjected together to the elevated temperature which is above the maximum temperature to which the thin film had been subjected during its lifetime in the normal sputtering process. A measurement of the percentage change in resistance for determining the maximum temperature can be performed. However, this procedure has the disadvantage of requiring the knowledge of the physical characteristics, particularly the initial resistance of each particular film, very accurately. The preferred method for determining the maximum temperature previously experienced by the thin film 14 is to interrogate the thin film after it has been subjected to the heat treatment. In this method, which is illustrated by FIGURE 9, the thin film, after the unknown treatment step, is placed in a furnace having means to accurately measure the temperature therein. The film resistance is measured by conventional procedure while the furnace temperature is steadily increased. As the temperature rises the resistance drops slowly because of the negative temperature coefficient of resistance (TCR), but at a certain point in time and temperature the resistance begins to drop off more rapidly and falls below the line representing the extrapolated slope due to the TCR.

The temperature measurement device can be manufactured in a wide variety of ways. One suitable way the thin film temperature measurement device can be manufactured is by starting with a silicon wafer which has a thin insulator, such as the thermally grown silicon dioxide or sputtered glass, over its surface. A cermet film, such as an intimate mixture of chromium and silicon monoxide, can then be deposited over the insulator film by vacuum evaporation. The two materials, chromium and silicon monoxide, are graded by sieving and blending in the desired weight ratio. The mixture is then dispensed by a mechanism which produces a steady trickle of the powder. The powder falls through a chute and impinges on a hot tantalum or tungsten filament within a vacuum jar evacuated to approximately $10^{-5}$ torr. To achieve instantaneous evaporation and maintain a uniform vapor composition, filament temperatures around 2000° C., are required. The vapor then condenses on the silicon wafer surface to form an amorphous film. The surface of the silicon wafer and the chromium-silicon monoxide film as deposited are maintained between about 150° and 300° C. For the purpose of the maximum temperature thermometer of the present invention, the lower the temperature of deposition the better, since, as mentioned above for the film to be effective as a maximum temperature thermometer, the temperature to be measured must be above the deposition temperature of the originally formed thin film. Immediately after the deposition of the cermet film and in the same vacuum chamber, a film of the desired conductor metal layer is preferably deposited over the entire cermet layer. The preferred conductor consists of layers of copper and chromium, although other metals or alloys can be used. The wafer is then removed from the vacuum chamber. The desired electrically conductive film pattern is then formed on the wafer by use of standard photoresist procedures together with a potassium ferric cyanide etch for the chromium and a potassium iodide-iodine etch for the copper. The conductive metal layers are appropriately formed over the entire wafer. The cermet thin film resistor pattern is then formed using standard photoresist techniques and a potassium ferric cyanide etch at approximately 60° C. The individual maximum surface temperature measurement device chips are then formed by dicing the wafer into chips of less than about 100 mils on each side and preferably 60 mils on each side. Each of the device chips would have one or more thin film resistors with the associated conductive layers of metal. Aluminum wires can then be ultrasonically bonded to the metal layers for future interrogation purposes. The ultrasonic bonding step is performed by use of commercially available equipment.

The following examples are included in order to aid in the understanding of the invention and variations may be made by one skilled in the art without departing from the spirit of the invention.

EXAMPLE 1

Four maximum surface temperature measurement devices were made as described above to produce a thin film device composed of a cermet 80 atomic percent chromium and 20 atomic percent silicon monoxide intimate mixture and having a FIGURE 1 structure. The devices had chromium-copper film contacts with ultrasonically bonded aluminum wires attached to the contacts for interrogation. The first three devices were subjected to a succession of higher temperatures for varying times, as shown by curves 60, 62 and 64 in FIGURE 7. The last device was subjected to a maximum temperature of 500° C. immediately as shown in curve 66. The results of this experiment as shown from FIGURE 7 verify the fact that the final resistance values reached by each one of the thin film devices depended only upon the maximum temperature that the film had been subjected to. For example, the device as represented by curve 66 reached the 500° C. within a few minutes while the devices as represented by the curves 60, 62 and 64 reached the 500° C. temperature after a period of up to several hours.

EXAMPLE 2

Nine maximum surface temperature measurement devices were made according to the process described above resulting in the FIGURE 1 devices wherein the devices were in composition between 0 and 50 atomic percent silicon dioxide and the remaining chromium. The resistance of each of the devices was taken at 400° C., 500° C. and 600° C. and the results were recorded in FIGURE 8 in terms of the percentage change in resistance of the thin film devices as a function of their atomic percent silicon monoxide. Curves 70, 72 and 74 are, respectively, the 400° C., 500° C. and 600° C. curves. The curves clearly show that except for very small percentages of silicon monoxide in the film, the larger the change in resistance that occurs as the result of the heating. It is therefore most desirable to have the film contain more than about 15% silicon monoxide so that the resistance changes can be more easily and accurately observed.

EXAMPLE 3

Three maximum surface temperature measurement devices of the FIGURE 1 configuration were made according to the procedure described above. The cermet resistor film contained 45 atomic percent silicon monoxide. They were heated for one hour at known temperatures of 322° C., 293° C. and 265° C., respectively. The devices were then cooled to room temperature, and subsequently interrogated by the method of recording the resistance of the device continuously as its temperature is increased. The resulting resistance vs. time curves are shown in FIGURE 9. The interrogation process yielded deviations of the resistances from linear behaviour for curves 80, 82 and 84 at respectively 331° C., 288° C. and 266° C. The known maximum temperatures were therefore almost exactly reproduced.

The invention thus provides a maximum surface temperature measurement device and method for using such a device. The device is very small and therefore can be placed on the article to have its maximum surface temperature recorded without having an appreciable effect on the article temperature or otherwise during this time. The device can also be readily manufactured by a variety of methods.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A maximum surface temperature sensing device for mounting over the surface of an article to have its maximum surface temperature measured comprising:
   a thermally conductive substrate;
   a thin film composed of an intimate mixture of chromium and silicon monoxide supported by said substrate;

electrically conductive layers of metal in electrical contact with said thin film and supported by said substrate; and means for providing a highly thermally conductive heat path between said substrate and said surface.

2. The maximum surface temperature sensing device of claim 1 wherein said means for providing a heat path is a gallium layer between said surface and said substrate.

3. The maximum surface temperature sensing device of claim 1 wherein the said film is composed of between about 5 and 60 atomic percent silicon monoxide and the remaining chromium.

4. The maximum surface temperature sensing device of claim 1 wherein the said film is composed of between about 15 and 50 atomic percent silicon monoxide and the remaining chromium.

5. The maximum surface temperature sensing device of claim 4 wherein said substrate is silicon.

6. The maximum surface temperature sensing device of claim 4 wherein said substrate is a metal covered with a layer of a dielectric material.

7. The maximum surface temperature sensing device of claim 6 wherein the said metal is molybdenum and the said dielectric is silicon monoxide.

8. The maximum surface temperature sensing device of claim 1 further comprising wire contacts ultrasonically bonded to said layers of metal.

9. The maximum surface temperature sensing device of claim 1 wherein said substrate is less than about 100 mils on each side and the said device is effective to measure the said maximum surface temperature above about that 150° C.

10. A method for determining the maximum surface temperature to which an article has been subjected comprising:

positioning a thin film adjacent to said article to be subjected to an elevated temperature;

said thin film being composed of an intimate mixture of chromium and silicon monoxide having a resistance characteristic that its resistance permanently changes to correspond to the maximum temperature to which it has been subjected;

subjecting the said thin film and said article to an elevated temperature above the maximum temperature to which said thin film had been subjected during its lifetime;

measuring the resistance of said thin film, following said subjecting to an elevated temperature, at successively higher known temperatures, and thereby determining said maximum surface temperature of said article by observing at what temperature the resistance begins to rapidly decrease.

11. The method of claim 10 wherein the said film is composed of between about 5 and 60 atomic percent silicon monoxide and the remaining chromium.

References Cited
UNITED STATES PATENTS

| | | | |
|---|---|---|---|
| 2,727,118 | 12/1955 | Longini et al. | 338—25 XR |
| 3,105,229 | 9/1963 | Sturm | 338—25 XR |
| 3,182,507 | 5/1965 | Rogen. | |
| 3,186,228 | 6/1965 | Lever et al. | |

LOUIS R. PRINCE, Primary Examiner

FREDERICK SHOON, Assistant Examiner

U.S. Cl. X.R.

338—25, 30